Patented Jan. 23, 1940

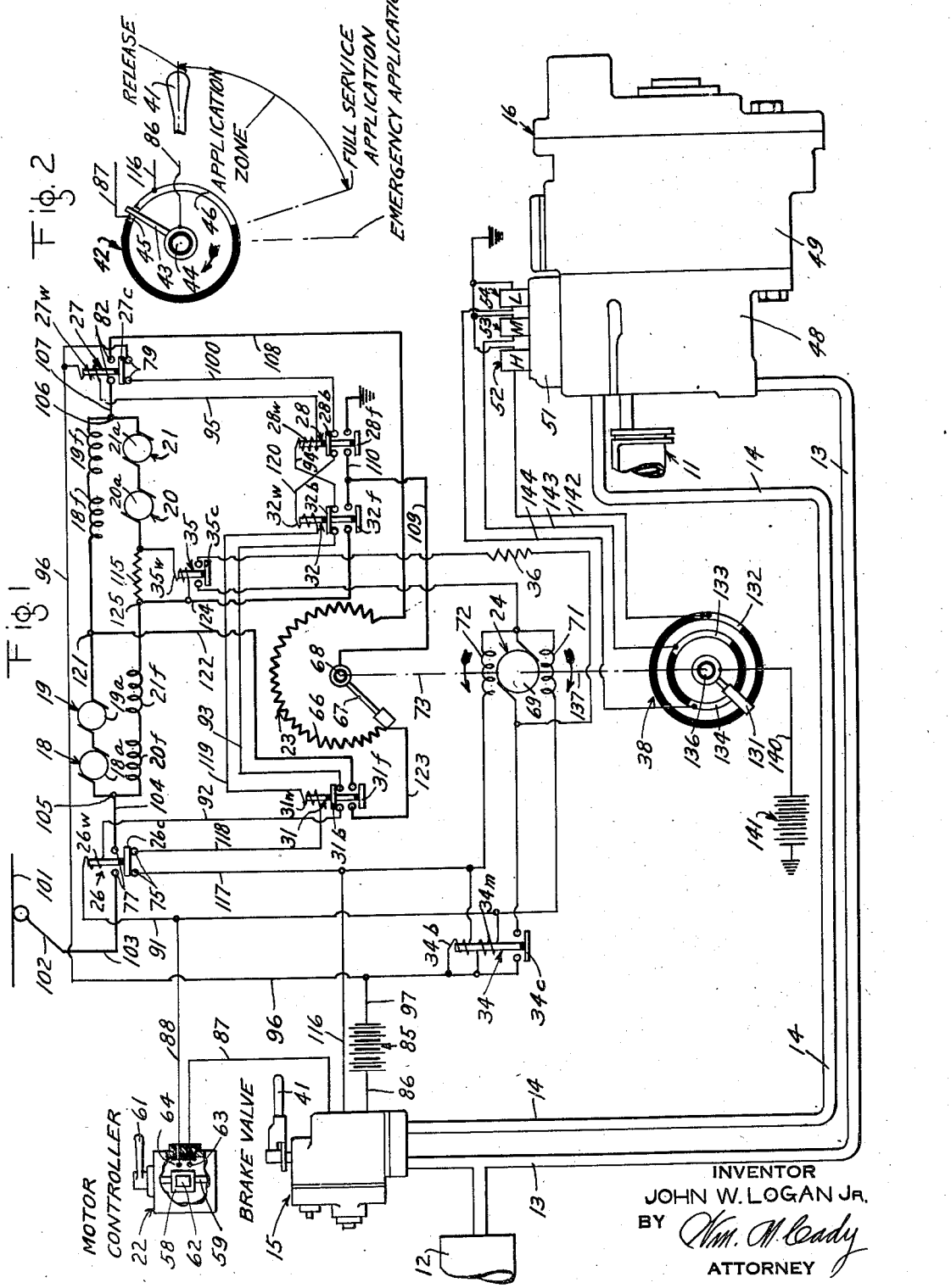

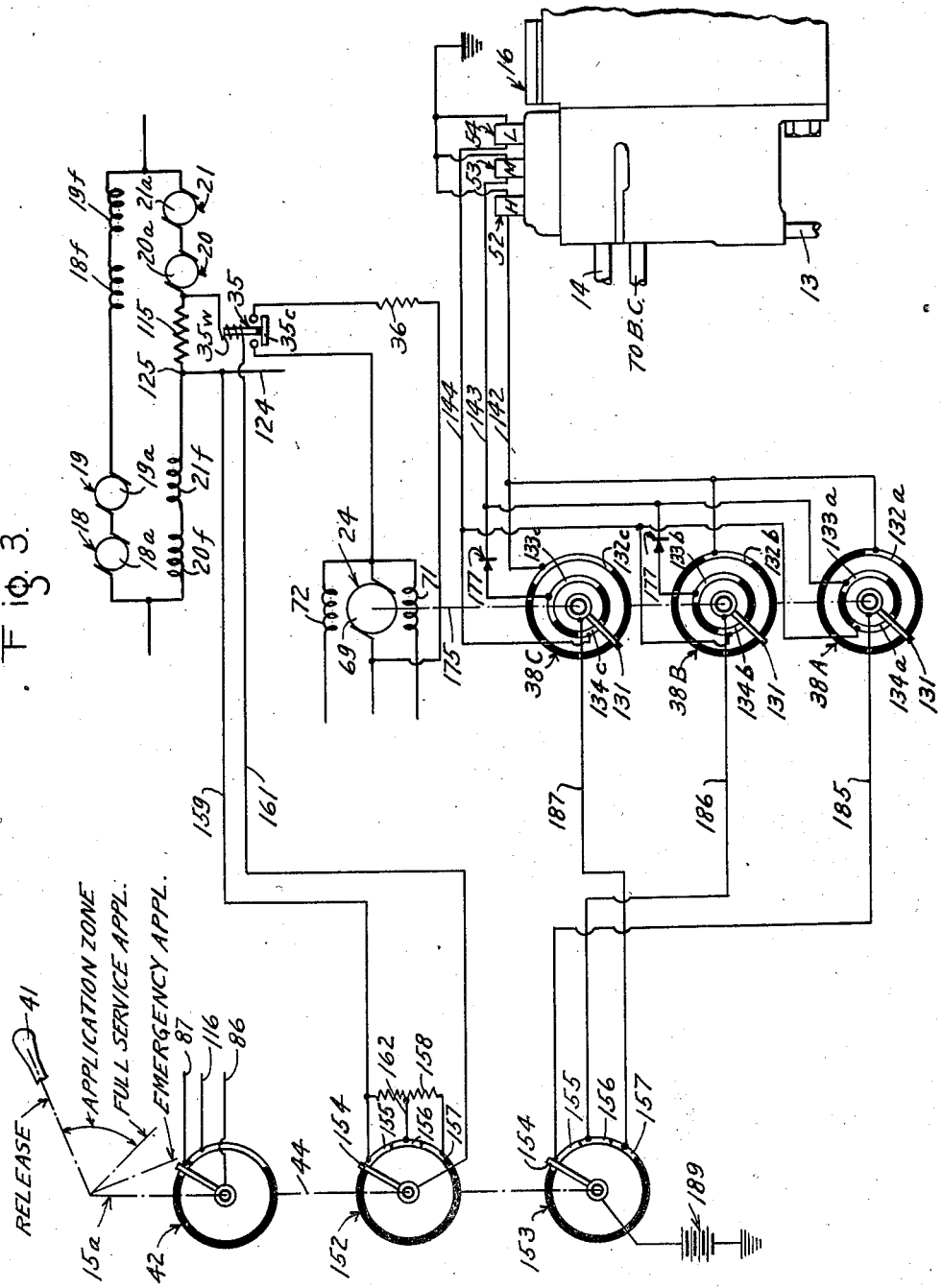

2,187,942

UNITED STATES PATENT OFFICE 2,187,942

BRAKE SYSTEM

John W. Logan, Jr., Forest Hills, Pa., assignor to The Westinghouse Air Brake Company, Wilmerding, Pa., a corporation of Pennsylvania Application December 4, 1937, Serial No. 178,061

21 Claims. (Cl. 303—3)

This invention relates to brake systems for vehicles, such as railway cars or trains, and particularly to vehicle brake systems wherein the degree of application of the brakes is controlled automatically in response to variations in the speed of the car or train.

Brake equipments in which the degree of application of the brakes on the car or train is controlled in response to variations in the speed of the car or train are well known. Various means are provided for controlling the degree of application of the brakes in response to variations in the speed of the car or train, such as a centrifugal governor or a fluid compressor operated at a speed corresponding to the speed of the car or train.

It is an object of my present invention to provide a novel arrangement, which does not require a centrifugal governor or speed controlled compressor, for controlling the degree of application of the brakes on a car or train in response to variations in the speed of the car or train.

More specifically, it is an object of my invention to provide a novel arrangement of the above-indicated character for a car brake system having a fluid pressure brake equipment and a dynamic brake equipment employing the traction motors of the car.

In a car brake system wherein the traction motors of the car are employed as dynamic brakes, a motor-operated rheostat is commonly provided for automatically cutting resistance out of the traction motor circuit to maintain a substantially constant rate of acceleration of the traction motors and a substantially constant rate of deceleration of the traction motors. The movable contact arm of the rheostat is shifted automatically during acceleration and deceleration, as by a motor, to cut resistance out of the motoring and the dynamic braking circuit and the position of the contact arm thus corresponds over a wide range of speeds substantially to the speed of the motors and, therefore, of the car or train. It is, accordingly, an additional object of my invention to utilize the variation in the position of the movable contact arm of the rheostat in a brake system of the above-indicated character for controlling the degree of application of fluid pressure brakes according to the speed of the car.

A still further object of my invention is to provide, in a brake system of the character indicated in the foregoing object, one or more control devices adapted to be synchronized with the movable contact arm of the rheostat for effecting reduction in the degree of application of the fluid pressure brakes on the car as the speed of the car reduces.

The above objects, and other objects of my invention that will be made apparent hereinafter, are attained by means of several embodiments of my invention which will subsequently be described and which are shown in the accompanying drawings, wherein:

Fig. 1 is a simplified diagrammatic view, showing one embodiment of my invention as applied to a brake system for a car or train having fluid pressure brake equipment and dynamic brake equipment.

Fig. 2 is a diagrammatic view, showing the electrical connections established in the various positions of the operating handle of the brake valve device shown in Fig. 1, and Fig. 3 is a fragmentary diagrammatic view, showing my invention as embodied in a brake system similar to that shown in Fig. 1 but differing therefrom in enabling the selection of a plurality of different degrees of application of the dynamic brakes.

Description of embodiment shown in Fig. 1

The brake system shown in Fig. 1 comprises a fluid pressure brake equipment including a brake cylinder 11, a source of fluid pressure such as a main reservoir 12, a supply pipe 13 connected to the main reservoir 12, a control pipe 14, a self-lapping brake valve 15 for controlling the pressure in the control pipe 14, and an electropneumatic valve mechanism 16 controlled both according to the pressure in the control pipe 14 and according to the speed of the car or train, as will be made apparent hereinafter, for supplying fluid under pressure from the supply pipe 13 to the brake cylinder 11 and for releasing fluid under pressure from the brake cylinder.

The brake system also comprises propulsion means for the car or train in the form of traction motors 18, 19, 20 and 21, a controller switch 22 under the control of the operator for initiating the supply of current to the motors 18 to 21 for propelling the car or train, and a rheostat 23 operated automatically by a rheostat motor 24. The control equipment for the motors 18 to 21 further includes three relays or electromagnetically operated switches 26 and 27 and 28 for establishing the motoring circuit of the motors 18 to 21 and two relays or electropneumatically operated switches 31 and 32 for establishing the dynamic braking circuit for the motors 18 to 21. The control equipment for the motors 18 to 21 also includes a relay 34 for controlling the rheostat motor 24, and a current-limiting relay 35 controlled according to the current in the circuit of the motors 18 to 21 for connecting a resistor 36 across the terminals of the armature winding on the rotor of the rheostat motor 24 to control the speed thereof.

According to my invention, I provide a selector switch device 38 controlled according to the operative position of the motor-operated rheostat 23 for controlling the energization and deenergization of electroresponsive or electromagnetic devices of the electropneumatic valve mechanism 16.

Considering the parts of the equipment in greater detail, the brake valve 15 is of the self-lapping type, described and claimed in Patent 2,042,112 of Ewing K. Lynn and Rankin J. Bush. In view of the detailed description of the type of brake valve given in the patent referred to, it is deemed unnecessary to describe the brake valve 15 except in a brief manner. The brake valve 15 comprises an operating handle 41 which is normally in a brake release position in which a suitable self-lapping valve mechanism within the casing of the brake valve is conditioned to exhaust fluid under pressure from the control pipe 14 to atmosphere. Operation of the brake valve handle 41 out of its normal release position is effective to operate the valve mechanism to establish a pressure in the control pipe 14 by supplying pressure from the supply pipe 13 to the pipe 14, the pressure established in the control pipe 14 corresponding substantially to the degree of displacement of the brake valve handle in a horizontal plane out of its normal position.

Brake valve 15 is also provided with a switch device 42 as shown in Fig. 2. The switch device 42 comprises a contact arm or finger 43 fixed in insulated relation on a rotary stem or shaft 44 which is turned according to the movement of the brake valve handle 41. Mounted in suitable insulated relation within the casing of the brake valve 15 are two contact segments 45 and 46. The contact segment 45 is relatively short and is engaged by the contact finger 43 when the handle 41 of the brake valve is in its normal release position. When the brake valve handle 41 is shifted out of its brake release position into the application zone, contact finger 43 is turned in a clockwise direction, as indicated by the arrow, to disengage the contact segment 45 and engage the contact segment 46 which is insulated from the contact segment 45. The contact segment 46 is relatively long and contact finger 43 remains in engagement with the contact segment 46 as long as the handle 41 of the brake valve is displaced out of its normal release position in the application zone. The function of the switch device 42 of the brake valve 15 will be made apparent hereinafter.

The electropneumatic valve mechanism 16 is of the type described in detail and claimed in the copending application Serial No. 88,098 of Ellis E. Hewitt, filed June 30, 1936, now Patent 2,140,624 assigned to the assignee of the present application, and is accordingly shown only in outline form. Briefly, however, the valve mechanism 16 includes a self-lapping valve portion 48, a portion 49 for effecting operation of the self-lapping valve portion 48, and a magnet valve portion 51 for controlling the operating portion 49.

The self-lapping valve portion 48 comprises a supply valve and a release valve for controlling respectively the supply of fluid under pressure from the supply pipe 13 to the brake cylinder 11 and the release of fluid under pressure from the brake cylinder.

The operating portion 49 comprises a plurality of unconnected movable abutments or diaphragms of different effective pressure areas, respectively, the diaphragms being arranged in spaced coaxial relation with the diaphragms decreasing successively in area.

The magnet valve portion 51 includes three electroresponsive or electromagnetic valve devices 52, 53, and 54 effective, respectively, to control the supply of fluid under pressure from the control pipe 14 to a corresponding chamber between the diaphragms in the operating portion 49 and the release of fluid under pressure therefrom.

With a given pressure established in the control pipe 14, the chambers between the diapragms are selectively vented or charged under the control of the magnet valve devices 52, 53 and 54 so that diaphragms of different areas are selectively rendered effective to operate the self-lapping valve portion 48 to establish different pressures in the brake cylinder. For example, when the magnet valve devices 52 and 53 are energized and the magnet valve device 54 is deenergized, the valve mechanism 16 operates to establish a pressure in the brake cylinder 11 which is substantially equal to the pressure established in the control pipe. When the magnet valve device 53 is energized and the magnet valve devices 52 and 54 are deenergized, the valve mechanism 16 operates to establish a pressure in the brake cylinder which is a certain per cent, such as seventy-five per cent, of the pressure established in the control pipe 14.

When all of the magnet valve devices 52, 53 and 54 are deenergized, the valve mechanism 16 is operative to establish in the brake cylinder a pressure which is a lower uniform per cent of the pressure established in the control pipe, for example fifty per cent. When the magnet valve device 54 is energized and the magnet valve devices 52 and 53 are deenergized, the valve mechanism 16 is operative to establish in the brake cylinder a pressure which is a still lower uniform per cent of the pressure established in the control pipe, for example thirty-three per cent.

Traction motors 18, 19, 20 and 21 are illustrated as of a direct-current type including a rotor armature winding and a series field winding designated respectively by numerals having suffixes $a$ and $f$ added to the numerals designating the corresponding motors. For example, the motor 18 comprises an armature winding 18$a$ and a field winding 18$f$. In actuality, traction motors which are employed as generators in dynamic braking systems employ additional field windings, known as "tickler" field windings but such windings have been omitted, for simplicity. It should be understood, however, that the motors 18, 19, 20 and 21 are intended to be of such construction as to function properly for the purposes desired.

As shown in Fig. 1, the armature windings 18$a$, 19$a$ and field windings 18$f$, 19$f$ of the motors 18 and 19 are connected in series relation while the armature windings 20$a$, 21$a$ and field windings 20$f$, 21$f$ of the motors 20 and 21 are connected in series relation, the series-connected motors 18 and 19 being connected in parallel relation with the two series-connected motors 20 and 21.

The motor controller switch 22 is shown in simplified form as comprising a casing containing a rotary drum 58 which is carried on a shaft 59 that is rotated by means of an operating handle 61, the rotary drum 58 carrying in insulating relation thereon a contact segment 62 adapted to connect in bridging relation two contact members 63 and 64 suitably mounted in insulated relation in the casing. With the handle 61 in "off" position, as shown, the segment 62 is disengaged from the contact members 63 and 64 and when the handle 61 is turned to "on" position the segment 62 connects the contact members 63 and 64.

The rheostat 23 may comprise a resistor 66 arranged in circular form and associated therewith a contact arm 67 which is carried in insulated relation on a shaft 68 that is turned by the rheostat motor 24.

The rheostat motor 24 comprises a rotor armature winding 69 and two stator field windings 71 and 72. When the armature winding 69 and the field winding 71 are energized, the shaft of the motor rotates in a direction to shift the arm 67 of the rheostat 23 in a clockwise direction to progressively cut resistance out of the motoring circuit. When the armature winding 69 and the field winding 72 are energized, the shaft of the motor 24 is rotated in the opposite direction to shift the arm 67 of the rheostat in a counter-clockwise direction and thereby to cut resistance out of the dynamic braking circuit including the traction motors.

The driving connection between the shaft of the rheostat motor 24 and the shaft 68 carrying the rheostat arm 67 may be of suitable character, including speed-reduction means, and is indicated by the broken line 73.

The various relays 26, 27, 28, 31, 32, 34 and 35 are of conventional construction comprising a magnetic core, an electromagnet winding associated with the magnetic core, and an armature actuated upon energization of the electromagnet winding from one position to another position, the armature being returned to its normal position as by gravity or by a biasing spring, upon deenergization of the winding. For simplicity, the aforementioned relays are indicated in diagrammatic form, the electromagnet winding of the relays being indicated as solenoids and the armature being indicated as a plunger.

The relay 26 comprises an electromagnet winding 26w which is effective, when energized, to shift the armature thereof so as to cause a contact member 26c to be shifted out of a position in which it bridges a pair of contact members 75 to a position in which it bridges a pair of contact members 77.

In a similar manner, the relay 27 comprises a winding 27w and a contact member 27c which normally bridges a pair of contact members 79 and which is effective when shifted to a second position upon energization of the winding, to bridge a pair of contact members 82.

The relays 28, 31 and 32 severally comprise a winding and two contact members, referred to hereinafter as the front contact member and the back contact member, respectively. When the winding of each of these relays is energized, the front contact member is shifted from a circuit-opening to a circuit-closing position and the back contact member is shifted from a circuit-closing position to a circuit-opening position. When the winding is deenergized, the front and back contact members return to circuit-opening and circuit-closing positions, respectively.

Briefly, the relay 28 comprises a winding 28w, a front contact member 28f and a back contact member 28b. The relay 31 comprises a winding 31w, a front contact member 31f and a back contact member 31b. The relay 32 comprises a winding 32w, a front contact member 32f, and a back contact member 32b.

The relay 34 differs from the other relays in having two electromagnet windings 34m and 34b which are effective individually at different times, as will be made apparent hereinafter, to actuate the armature of the relay to shift a single contact member 34c from a circuit-opening position to a circuit-closing position.

The current-limiting relay 35 comprises an electromagnet winding 35w and a single contact member 35c which is actuated from a circuit-opening position to a circuit-closing position upon energization of the winding 35w by a current exceeding a certain value.

In order to render more clear the function of the various relays in the control of the traction motors 18 to 21, a brief description of the operation of the motor control system both in motoring and in braking will now be given. With the handle 41 of the brake valve 15 in its normal brake release position, operation of the handle 61 of the motor controller 22 from "off" to "on" position causes the contact segment 62 on the drum 58 to connect the contact members 63 and 64 and thereby complete a circuit for energizing the relays 26, 27 and 28. The circuit extends from one terminal of a source of electric current, such as battery 85, through a wire 86 which is connected to the contact arm 43 of the switch device 42 included in the brake valve device 15, contact arm 43, contact segment 45, a wire 87, contact member 63, contact segment 62 and contact member 64 of the motor controller 22, wires 88 and 91, winding 26w of relay 26, a wire 92, back contact member 31b of relay 31, a wire 93, back contact member 32b of relay 32, a wire 94, winding 28w of relay 28, a wire 95, winding 27w of relay 27 and wires 96 and 97 to the other terminal of the storage battery 85. The winding 34m of the relay 34 is connected across the wires 91 and 96 of the above-described circuit and is thus also energized upon the completion of the above-described circuit.

As a result of the energization of the respective windings of the relays 26, 27 and 28 a circuit is completed for supplying motoring current to the traction motors 18, 19, 20 and 21, the current being supplied from one terminal of an external source by way of a trolley wire 101, a trolley 102, a wire 103, contact members 77 and 26c of relay 26, a wire 104 to a point 105, where the circuit divides into two branches, one of which includes the motor armature windings 18a, 19a and field windings 18f, 19f and the other of which includes the motor field windings 20f, 21f and the motor armature windings 20a, 21a, the branches rejoining at a point 106 and continuing by way of a wire 107, contact members 82 and 27c of the relay 27, a wire 108, resistor 66 of the rheostat 23, contact arm 67, wires 109 and 110, front contact member 28f of relay 28, then returning, as through ground in the manner indicated, to the opposite terminal of the external source.

Upon the energization of the winding 34m of the relay 34, the contact member 34c is shifted to circuit-closing position to connect the field winding 71 and the armature winding 69 of rheostat motor 24 in series relation across the wires 91 and 96, thereby causing the arm 67 of the rheostat 23 to start to move in a clockwise direction to progressively cut the resistor 66 out of the above-described circuit.

As the rotating armature winding of each of the traction motors increases in speed, the counter-electromotive force generated in the armature winding and acting in a direction opposite to the imposed voltage increases, and consequently the current in the motor circuit decreases.

The winding 35w of the current-limiting relay 35 is connected across a resistor 115 in the motor circuit and when the current in the motor circuit falls due to the increase in speed of the motors, the voltage drop across the resistor 115 is insufficient to maintain the winding 35w of the relay 35 sufficiently energized to maintain the contact member 35c in circuit-closing position. Accordingly, the contact member 35c shifts to circuit-opening position, thereby disconnecting resistor 36 from shunt relation with the armature winding 69 of the rheostat motor 24. With the resistor 36 connected in parallel with the armature winding 69 of rheostat motor 24, the rotor of the rheostat motor 24 rotates at a slow speed. It follows, therefore, that when the contact member 35c of the current-limiting relay 35 opens the resistance shunt around the armature winding 69 of the rheostat motor 24, the rheostat motor speeds up and thus causes the arm 67 on the rheostat 23 to be moved to more rapidly cut out an increasing amount of the resistor 66 so as to cause an increase in the current flowing in the motor circuit.

When the current in the motor circuit thus again increases so that the voltage drop across the resistor 115 is sufficient to pick-up the current-limiting relay 35 and cause the resistor 36 to be shunted across the armature winding 69 of the rheostat motor 24, the rheostat motor again rotates at a slow speed.

It will thus be seen that the speed of the rheostat motor 24 is automatically controlled in response to variations in the current flowing in the motor circuit to cause arm 67 of the rheostat 23 to shift alternately at a fast rate and at a slow rate as the speed of the car or train increases, to progressively cut an increasing amount of the resistor 66 out of the circuit and thereby maintain a substantially uniform current in the motor circuit. The traction motors 18 to 21 are thus accelerated at a substantially uniform rate until the rheostat arm 67 cuts all of the resistor 66 of the rheostat 23 out of the motor circuit.

When the rheostat arm 67 reaches an extreme position in clockwise direction, wherein it cuts all of the resistor 66 out of the circuit, the motors 18 to 21 will continue to accelerate up to the maximum speed thereof but not necessarily at the substantially uniform rate effective when the rheostat 23 operates. As a practical matter, well known means is provided for interrupting the circuit of the rheostat motor 24 when the rheostat arm 67 reaches the limit of its movement in the clockwise direction but such means has been omitted from the drawings in order to simplify the description of my invention.

If it is desired to connect the traction motors 18, 19, 20 and 21 as generators to effect dynamic braking, the motor controller 22 being in its circuit-closing position for causing current to be supplied to the motors, the handle 41 of the brake valve 15 is shifted out of its normal position into the application zone. The circuit for energizing the relays 26, 27 and 28 is accordingly interrupted due to the disengagement of the contact arm 43 of the switch device 42 of the brake valve 15 from the contact member 45, and the consequent dropping out of the relays effects the interruption of the motor circuit previously described. With the handle 41 of the brake valve 15 shifted into application zone, the contact arm 43 of the switch device 42 engages the contact segment 46 and establishes a circuit for energizing the windings 31w and 32w of the relays 31 and 32 as well as the winding 34b of the relay 34. This circuit extends from one terminal of battery 85 through wire 86, contact finger 43 of switch device 42, contact segment 46, wires 116 and 117, contact members 75 and 26c of relay 26, a wire 118, winding 31w of relay 31, a wire 119, winding 32w of relay 32, a wire 120, back contact member 28b of relay 28, a wire 100, contact members 79 and 27c of relay 27, and wires 96 and 97 back to the opposite terminal of battery 85.

As a result of the energization of the windings of the relays 31 and 32, the back contact members 31b and 32b of the relays are shifted to circuit-opening position to prevent the establishment of the circuit for energizing the motoring relays 26, 27 and 28 and the front contact members 31f and 32f are shifted to circuit-closing position to establish a dynamic braking circuit including the traction motors 18, 19, 20 and 21.

The dynamic braking circuit may be traced from a point 121 connected to one terminal of armature winding 19a of the motor 19, through a wire 122, front contact member 31f of the relay 31, a wire 123, resistor 66 of the rheostat 23, contact arm 67, wires 109 and 110, front contact member 32f of the relay 32 and a wire 124 to a point 125, whence the circuit divides into two branches, one branch extending by way of the field windings 20f and 21f of the motors 20 and 21, and armature windings 18a and 19a of the motors 18 and 19 to the point 121, and the other branch extending through the resistor 115, armature windings 20a and 21a of the motors 20 and 21, and field windings 18f and 19f of the motors 18 and 19 to the point 121.

The motors thus operate as generators to cause flow of current in the dynamic braking circuit resulting in a retarding effect on the car or train in the usual manner.

The energization of the winding 34b of the relay 34 causes contact member 34c to be actuated to circuit-closing position to connect the armature winding 69 and field winding 72 of the rheostat motor 24 in series relation across the wires 117 and 96, thereby causing the rotor of the rheostat motor 24 to rotate in the direction to cause the contact arm 67 of the rheostat 23 to shift in a counterclockwise direction.

The current-limiting relay 35 functions to control the rheostat motor 24, when the motors 18 to 21 operate as generators, in the same manner as when the motors propel the car or train. If the position of the rheostat arm 67 is such that the current in the dynamic braking circuit is insufficient to pick-up the relay 35, the armature winding of the rheostat motor 24 remains unshunted and consequently the arm 67 is shifted at a rapid rate to cut an increasing amount of the resistor 66 out of the dynamic braking circuit so as to cause an increase in the current in the dynamic braking circuit. When the current in the dynamic braking circuit increases to such an extent that the voltage drop across the resistor 115 is sufficient to pick-up the relay 35, the armature winding 69 of the rheostat motor 24 is shunted by the resistor 36 and the rotor of the rheostat motor 24 is retarded in speed.

The rheostat motor 24 thus shifts the arm 67 of the rheostat 23 alternately at a rapid rate and a slow rate in a counterclockwise direction so as to regulate the dynamic braking current to a substantially constant value and, accordingly, the rate of retardation of the traction motors to a substantially uniform rate. It will be apparent that the arm 67 of rheostat 23 thus shifts in position substantially according to the reduction in the speed of the car or train.

When the arm 67 of the rheostat 23 reaches its limit in the counterclockwise direction, it is effective to cause interruption of the circuit of the rheostat motor 24 in a well known manner by means not shown. It will be apparent, furthermore, that although the arm 67 may be in its extreme position in a clockwise direction at the time the application of the brakes is initiated, the arm 67 is rapidly shifted to different positions corresponding to the actual speed of the car or train because the rheostat motor 24 continues to shift the arm 67 in a counterclockwise direction at a rapid rate as long as the current in the dynamic braking circuit is insufficient to pick-up the current-limiting relay 35 and connect the resistor 36 in shunt with the armature winding 69 of the rheostat motor 24. Thus, depending upon the actual speed of the car or train at the time the dynamic braking circuit is established, the rheostat motor 24 initially shifts the arm 67 of the rheostat 23 a greater or less degree so that, in reality, the arm 67 does assume a position corresponding to the speed of the car or train substantially at the time that the dynamic braking circuit is established and thereafter shifts according to the reduction in speed of the car or train.

The selector switch 38 comprises a contact arm 131 positioned according to the position of the rheostat arm 67, and adapted to selectively engage a plurality of contact segments 132, 133 and 134 to establish circuits for energizing the magnet valve devices 52, 53 and 54 of the valve mechanism 16.

The arm 131 of the selector switch 38 is diagrammatically indicated as carried in insulated relation on a shaft 136 which is driven by rotation of the rotor of the rheostat motor 24. The driving connection between the rotor of the rheostat motor 24 and the shaft 136 is indicated by the broken line 137, but it will be understood that, in practice, the shaft 136 may be connected directly to the shaft 68 carrying the arm 67 of the rheostat 23 so as to employ the same speed-reducing means as employed for the rheostat arm 67.

The segments 132, 133 and 134 are mounted stationarily in any suitable manner in insulated relation from each other and are disposed in spaced relation around the shaft 136 of the selector switch 38 so that when the contact arm 131 is in its extreme position in a counterclockwise direction, as shown, it engages only the contact segment 134. As the contact arm 131 rotates in a clockwise direction, it remains in engagement with the contact segment 134 for a given angle and then disengages the segment and travels through an arc in which it does not engage any of the segments 132, 133 or 134. Thereafter, as the arm 131 continues to move in a clockwise direction, it engages the contact segment 133 and continues in engagement with only the contact segment 133 over a given angle in the clockwise direction. After the contact arm 131 has traversed the last said angle it engages the contact segment 132 without disengaging the contact segment 133 and thereafter remains in contact with both the contact segments 133 and 132 as long as the arm 131 continues in a clockwise direction.

When the arm 131 is rotated in a counterclockwise direction from its extreme position in a clockwise direction, it successively disengages contact segments 132 and 133, traverses an angle through which it engages none of the segments 132, 133 or 134, and then reengages the contact segment 134 which it continues to engage thereafter as it is returned to its extreme position in a counterclockwise direction.

The contact arm 131 of the selector switch 38 is connected, as by a wire 140, to one terminal of a source of current, such as a storage battery 141, and the segments 132, 133 and 134 are connected by wires 142, 143 and 144, respectively, to corresponding terminals of the electromagnet windings of the magnet valve devices 52, 53 and 54, respectively.

The opposite terminals of the electromagnet windings of the magnet valve devices 52, 53 and 54 are all connected to the opposite terminal of the battery 141, as through a ground connection in the manner shown.

It will thus be seen that when the contact arm 131 of the selector switch 38 engages the contact segment 134, a circuit is established for energizing the electromagnet of the magnet valve device 54; that when the contact arm 131 engages the contact segment 133, a circuit is established for energizing the electromagnet of the magnet valve device 53, and that when the contact arm 131 engages the contact segment 132, a circuit is established for energizing the electromagnet of the magnet valve device 52. Since the arm 131 of the selector switch 38 is positioned according to the position of the arm 67 of the rheostat 23 and thus according to the speed of the car or train, it will be seen that with the dynamic brakes applied the magnet valve devices 52, 53 and 54 are selectively energized or deenergized so as to cause the valve mechanism 16 to operate to vary the pressure in the brake cylinder 11 as the speed of the car or train varies.

*Operation of equipment shown in Fig. 1*

Let it now be assumed that the operator has shifted the handle 61 of the motor controller 22 to circuit-closing position to establish the motoring circuit to the traction motors 18, 19, 20 and 21 and that the motors are being driven by current supplied from the trolley wire 101 to drive the car or train, the arm 67 of the rheostat 23 being correspondingly shifted to its extreme position in a clockwise direction. If, now, the operator shifts the handle 41 of the brake valve 15 to effect an application of the brakes, the motoring circuit is interrupted and the dynamic braking circuit is established in the manner previously described. At the same time a fluid pressure is established in the control pipe 14 corresponding to the degree of displacement of the handle 41 of the brake valve 15 out of its normal release position.

As previously described, when the dynamic braking circuit is established, the rheostat motor 24 is operated to shift the arm 67 of the rheostat 23 to a position corresponding to the speed of the car or train at the time the application of the brakes is initiated. If the speed of the car or train at the time the application of the brakes is initiated exceeds a certain high speed, such as sixty miles per hour, the rheostat arm 67 is positioned so that the arm 131 of the selector switch 38 engages the contact segments 132 and 133 to effect energization of the magnet valve devices 52 and 53, the magnet valve device 54 being deenergized.

As previously explained, with the magnet valve devices 52 and 53 energized and valve device 54 deenergized, the valve mechanism 16 is operative to cause fluid under pressure to be supplied to the brake cylinder 11 and establish therein a pressure which is equal to the pressure established in the control pipe 14.

As the speed of the car or train reduces, due to the application of the fluid pressure brake and the dynamic brake, the rheostat arm 67 and the contact arm 131 of the selector switch 38 are shifted in a counterclockwise direction correspondingly to the reduction in the speed of the car or train.

When the car or train reduces in speed below the certain uniform speed, such as sixty miles per hour, the arm 131 in shifting in a counterclockwise direction disengages the contact segment 132 and thus effects deenergization of the magnet valve device 52. Thus, only the magnet valve device 53 is now energized, since the contact arm 131 engages only the contact segment 133. As a result, valve mechanism 16 operates to cause the pressure in the brake cylinder 11 to be reduced to a value which, as previously assumed, may be seventy-five per cent of the pressure established in the control pipe 14.

Thereafter, as the speed of the car or train continues to reduce, the arm 131 remains in engagement with the contact segment 133 until the speed reduces below an intermediate speed, such as forty miles per hour. Thereupon, the contact arm 131 disengages the contact segment 133 and thereby effects deenergization of the magnet valve device 53. Since the contact arm 131 is now disengaged from all of the contact segments 132, 133 and 134, all of the magnet valve devices 52, 53 and 54 are deenergized and, consequently, the valve mechanism 16 operates to further reduce the pressure in the brake cylinder to a value which, as previously assumed, may be fifty per cent of the pressure established in the control pipe 14.

As the speed of this car or train reduces further, the contact arm 131 shifts correspondingly in a counterclockwise direction, none of the magnet valve devices 52, 53 and 54 being energized until the contact arm 131 engages the contact segment 134, at which time the magnet valve device 54 is energized to cause the valve mechanism 16 to operate to effect a further reduction in brake cylinder pressure so as to establish a pressure therein which, as previously assumed, may be thirty-three per cent of the pressure established in the control pipe 14. The engagement of the contact arm 131 with the contact segment 134 may be arranged to take place when the speed of the car or train reduces to a predetermined low speed, such as twenty miles per hour.

As the car or train reduces in speed below the predetermined low speed of twenty miles per hour and approaches a complete stop, the contact arm 131 remains in engagement with the contact segment 134 and thus when the car or train is brought to a complete stop, the magnet valve device 54 remains energized. Consequently, the pressure established in the brake cylinder 11 remains at a value which is, for example, thirty-three per cent of the pressure established in the control pipe 14.

If desired, the operator may shift the handle 41 of the brake valve 15 a further degree into the application zone, after the car or train has been completely stopped, so as to increase the pressure in the control pipe 14. The valve mechanism 16 is accordingly operated to increase the pressure in the brake cylinder proportionately, the percentage of the pressure in the brake cylinder to that in the control pipe 14 remaining the same, however.

In order to effect release of the brakes, after the car or train has been brought to a stop, the operator merely shifts the handle 41 of the brake valve device 15 to release position to reduce the pressure in the control pipe 14 to atmospheric pressure. The valve mechanism 16 then operates, in response to such reduction of fluid pressure in the control pipe, to reduce the pressure in the brake cylinder 11 to atmospheric pressure, thereby effecting release of the fluid pressure brakes. Obviously, if the operator desires to release the brakes without immediately starting the car or train, he must first turn the handle 61 of the motor controller 22 to "off" position, as shown, before returning the handle 41 of the brake valve 15 to brake release position, or otherwise the motoring circuit will be immediately reestablished upon return of the brake valve handle 41 to its normal release position.

If an application of the brakes is initiated by operation of the handle 41 of the brake valve 15 into its application zone while the car or train is traveling at a speed less than the predetermined high speed of sixty miles per hour, the rheostat motor 24 will shift the contact arm 131 of the selector switch 38 to a position corresponding to that speed sufficiently rapidly that the maximum pressure established in the brake cylinder 11 will correspond to the particular range or zone of speed within which the car or train is traveling at the time the application was initiated. Thereafter, as the speed of the car or train reduces, the brake cylinder pressure will be reduced in steps as the arm 131 of the selector switch 38 is progressively shifted in a counterclockwise direction according to the reduction of speed of the car or train.

*Embodiment shown in Fig. 3*

The embodiment of my invention shown in Fig. 3 differs from that shown in Fig. 1 in the provision of a brake valve 15a similar to the brake valve 15 but adapted, in addition, to select different degrees of retarding force to be exerted by the traction motors 18, 19, 20 and 21 when functioning as dynamic brakes. To this end, the brake valve 15a has two additional switch devices 152 and 153 which the brake valve 15 does not have and, in place of only one selector switch 38 operated by the rheostat motor 24, three selector switches 38A, 38B and 38C are provided.

The switch devices 152 and 153 of the brake valve 15a are identical and each comprises a contact arm 154, fixed in insulated relation on the shaft 44 to which the contact arm 43 of the switch device 42 is fixed, and three associated contact segments 155, 156 and 157 insulated from each other and adapted to be successively engaged in the order named by the contact arm 154 as the arm is rotated in response to the shifting of the handle 41 of the brake valve out of its normal release position into the application zone.

The contact segment 155 of the switch device 152 is connected to the point 125 at one end of the resistor 115 in the motor circuit by the wire 124 and a branch wire 159. Contact arm 154 of the switch device 152 is connected by a wire 161 to one terminal of the electromagnet winding 35w of the current-limiting relay 35, the other terminal of the winding 35w being connected to the opposite terminal of the resistor 115. A resistor 158 is connected across the contact segments 155 and 157 of the switch device 152 and the contact segment 156 is connected by a wire 162 to an intermediate point on the resistor 158.

The arrangement of the contact segments 155, 156 and 157 of the switch device 152 is such that in the normal brake release position of the brake valve handle 41, the contact arm 154 engages the contact segment 155 and establishes the simple circuit shown for impressing the entire voltage drop of the resistor 115 on the winding 35w of relay 35. When the handle 41 is shifted more than a certain angle into the application zone, the arm 154 of the switch device 152 disengages the segment 155 and engages the segment 156, thereby inserting a portion of the resistor 158 in series with the winding 35w of the relay 35 so that only a fraction of the voltage drop on the resistor 115 is impressed on the winding 35w.

When the brake valve handle 41 is shifted beyond full service application position to emergency application position, the contact arm 154 of the switch device 152 disengages the contact segment 156 and engages the contact segment 157, thereby inserting all of the resistor 158 in series with the winding 35w of the relay 35 so that an even lower fraction of the voltage drop on the resistor 115 is impressed on the winding 35w.

It will be apparent that with the resistor 158 cut out of the circuit and the entire voltage drop across the resistor 115 in the motor circuit effective to energize the winding 35w of the current limiting relay 35, the winding 35w of the relay 35 will be energized sufficiently to actuate the contact member 35c thereof to circuit-closing position to connect the resistor 36 in shunt relation to the armature winding 69 of the rheostat motor 25 when the current in the motor circuit exceeds a certain value.

With the contact arm 154 of the switch device 152 in contact with the contact segment 156 and a portion of the resistor 158 in series with the winding 35w of the current-limiting relay 35, a higher current in the motor circuit is necessary in order that the fraction of the total voltage drop across the resistor 115 impressed on winding 35w be sufficient to cause the contact member 35c of the current-limiting relay 35 to be actuated to circuit-closing position.

In a similar manner, with the entire resistor 158 in series with the winding 35w of the relay 35, the current in the motor circuit must be still higher in order that the fraction of the total voltage across the resistor 115 impressed on winding 35w be sufficient to effect actuation of the contact member 35c to circuit-closing position.

It will be apparent, therefore, that since the retarding force exerted by the traction motors 18, 19, 20 and 21 while acting as dynamic brakes is proportional to the current flowing in the dynamic braking circuit, the displacement of the brake valve handle 41 different degrees out of its normal release position will so vary the response of current-limiting relay 35 to the current in the dynamic braking circuit, that the rheostat 23 will automatically regulate the dynamic braking current and therefore the retarding force exerted by the traction motors to different values.

In order for the current in the dynamic braking circuit to be greater at a given speed, the amount of resistor 66 of rheostat 23 in the dynamic braking circuit must be correspondingly less. It follows, therefore, that the contact arm 67 of rheostat 23 will be shifted further in a counterclockwise direction from its extreme position in a clockwise direction, at a given speed, as the current in the dynamic braking circuit is increased by operation of the brake valve 15a.

Thus since the position of rheostat arm 67 is different at a given speed, depending upon the operative position of brake valve handle 41, it is necessary to provide a selector switch, corresponding to the selector switch 38 of the embodiment shown in Fig. 1, for each of the three positions of the contact arm 154 of the switch device 152 and also to provide means for automatically selecting the proper selector switch corresponding to the position of the arm 154 of the switch device 152. Accordingly, the three selector switches 38A, 38B and 38C are provided which differ from the selector switch 38 in the arrangement and length of the contact segments thereof.

Each of the selector switches 38A, 38B and 38C comprises a contact arm 131, corresponding to the arm 131 of the selector switch 138 and fixed in spaced insulated relation along a common shaft 175 adapted to be rotarily moved and positioned according to rotation and position of the rotor shaft of the rheostat motor 24. If desired, the shaft 175 may be connected to or be an extension of the shaft 68 carrying the arm 67 of the rheostat 23. In any case, the arms 131 of the three selector switches are always positioned according to the position of the arm 67 of the rheostat 23.

The contact arm 131 of the selector switch 38A is adapted to engage associated contact segments 132a, 133a and 134a, corresponding respectively to the contact segments 132, 133 and 134 of the selector switch 38. In a similar manner, the contact arm 131 of the selector switch 38B has associated therewith contact segments 132b, 133b and 134b, and the arm 131 of selector switch 38C has associated therewith contact segments 132c, 133c and 134c.

The contact segments 132a, 132b and 132c are of different lengths, contact segment 132a being shortest, contact segment 132c being longest and the contact segment 132b being of intermediate length. In a similar manner, the contact segments 133a, 133b and 133c are of different lengths, the contact segment 133a being shortest, the contact segment 133c being longest and the contact segment 133b being of intermediate length. The contact segments 134a, 134b and 134c are also of different lengths, but conversely to the other contact segments, contact segment 134a is longest, contact member 134c is shortest, and the contact segment 134b is of intermediate length.

As is clearly apparent in Fig. 3, the corresponding contact segments of the three selector switches 38A, 38B and 38C are connected respectively to the wires 142, 143 and 144 leading to the magnet valve devices 52, 53 and 54 of the electropneumatic valve mechanism 16.

An asymetric device 177 is interposed in the circuit between the contact segment 133b and wire 143, and also a similar device 177 between contact segment 133c and wire 143, to prevent back flow of current from the wire 143 to the segments and the undesirable results which would otherwise occur, as will be explained more fully hereinafter.

The contact arms 131 of the selector switches 38A, 38B and 38C are connected to the contact segments 155, 156 and 157, respectively, of the switch device 153 associated with the brake valve 15a, by wires 185, 186 and 187. The contact arm 154 of the switch device 153 is connected to one terminal of a source of current, such as a storage battery 189, the opposite terminal of the battery being grounded to establish a return circuit from the electromagnet windings of the magnet valve devices 52, 53 and 54 of the valve mechanism 16.

It should now be apparent that depending upon which of the segments 155, 156 or 157 is engaged by the contact arm 154 of switch device 153, selector switch 38A, 38B or 38C, respectively, is rendered effective to control the magnet valve devices 52, 53 and 54 of the valve mechanism 16. Thus, with the contact arm 154 of the switch device 153 engaging the contact segment 155, the selector switch 38A is rendered effective to control the magnet valve devices 52, 53 and 54, the selector switches 38B and 38C being rendered noneffective. In a similar manner, if the contact arm 154 of the switch device 153 engages contact segment 156, the selector switch 38B is rendered effective to control the magnet valves 52, 53 and 54 while the selector switches 38A and 38C are rendered non-effective.

Since the arms 131 of the selector switches 38A, 38B and 38C move in synchronism, however, and since the contact segments 132a, 132b and 132c are of different lengths as are the contact segments 133a, 133b and 133c, it is necessary to provide the asymetric devices 177 in order to prevent undesired energization of the magnet valve 52. Obviously, since the contact segments 132b and 132c are longer than the contact segment 132a of the selector switch 38A, the asymetric devices 177 must be provided to prevent the flow of current from the wire 143 to the wire 142 by way of the contact arms 131 of the selector switches 38B and 38C when, with the selector switch 38A selected to control the magnet valve devices 52, 53 and 54, the contact arm 131 of the selector switch 38A is shifted in a counterclockwise direction, upon dynamic braking, to disengage the contact segment 132a and engage only the contact segment 133a.

The asymetric device 177, interposed between the wire 143 and the contact segment 133c of the selector switch 38C, is also required to prevent undesired energization of the magnet valve 52 when, with the selector switch 38B selected to control the magnet valves of valve mechanism 16, the contact arm 131 of the selector switch 38B shifts in a counterclockwise direction, upon dynamic braking, to disengage the contact segment 132b and engage only the contact segment 133b.

The contact segments of the three selector switches 38A, 38B and 38C are of such lengths, respectively, that each selector switch is effective to cause deenergization of the magnet valves 52 and 53 and energization of the magnet valve 54 at substantially uniform speeds for each magnet valve. The reason for the different lengths of corresponding contact segments in the three selector switches 38A, 38B and 38C should now be apparent because the position of the contact arms 131 of the selector switches advances in a counterclockwise direction, for a given speed, as the dynamic braking current is increased by variation in the position of the contact arm 154 of the switch device 153 associated with the brake valve 15. Consequently, the contact segment 132b of the selector switch 38B must be longer and extend further in a counterclockwise direction than the segment 132a of the selector switch 38A. Similarly, contact segment 132c of the selector switch 38C must be longer and extend further in a counterclockwise direction than the contact segment 132b of the selector switch 38B.

For the same reason, the contact segments 133a, 133b and 133c are of successively greater lengths, in the order named, and contact segments 134a, 134b and 134c are of successively decreasing lengths in the order named.

In operation, the system shown in Fig. 3 is similar to that of the system shown in Fig. 1, each of the selector switches 38A, 38B and 38C functioning to so control the valve mechanism 16 as to reduce the brake cylinder pressure in steps as the speed of the car or train reduces, only one of the selector switches 38A, 38B and 38C being effective at one time dependent upon the degree to which the brake valve handle 41 is shifted out of its normal release position. It is accordingly deemed unnecessary to describe in detail the operation of the equipment shown in Fig. 3 inasmuch as the operation should be clear from the previous description of the operation of the system shown in Fig. 1 taken together with the above description of the equipment shown in Fig. 3.

*Summary*

Summarizing, it will be seen that I have disclosed a car or train brake system comprising fluid pressure brake equipment and dynamic brake equipment and including also, according to my invention, an arrangement for reducing the degree of application of the fluid pressure brakes as the speed of the car or train reduces. More specifically, the reduction in the degree of application of the fluid pressure brakes is effected in accordance with the position of the movable contact arm of the motor-operated rheostat which is associated with the traction motors of the car to regulate to a substantially uniform rate the acceleration and deceleration of the motors during motoring and dynamic braking, respectively. The movable contact arm of the rheostat is shifted substantially according to variations in the speed of the traction motors and the control of the fluid pressure brakes is effected through the medium of control devices synchronized with the movable contact arm of the rheostat.

A second embodiment of my invention is disclosed in connection with a brake system in which any one of a plurality of degrees of retardation by the dynamic brake equipment may be optionally selected.

It will be apparent that my invention utilizes existing equipment in a combined fluid pressure and dynamic brake system and thereby obviates the necessity of employing additional speed-responsive equipment in the form of a centrifugally operated governor or a speed-controlled compressor, thereby simplifying and lessening the cost of the brake system as a whole.

While I have shown only two embodiments of my invention each representative of a brake system for a single car, it will be readily apparent that in adapting my invention to a brake system for a train of cars, duplicate equipment to that shown is provided for each car in the train, all the equipments being in parallel with that shown in the drawings and under the control of the motor controller and brake valve on the control car. Obviously, various omissions, additions or modifications may be made in the embodiments shown without departing from the spirit of my invention and it is, accordingly, not my intention to limit the scope of my invention except as it is necessitated by the scope of the prior art.

Having now described my invention, what I claim as new and desire to secure by Letters Patent, is:

1. A vehicle brake system comprising a brake cylinder, means operative to cause fluid under pressure to be supplied to the brake cylinder to effect an application of the fluid pressure brakes, at least one traction motor for said vehicle operative as a generator in a dynamic braking circuit to retard the motion of the vehicle, and means under the control of the current in the dynamic braking circuit for automatically effecting a reduction in brake cylinder pressure as the speed of the vehicle reduces during an application of the brakes.

2. A vehicle brake system comprising a brake cylinder, a valve mechanism operative upon the supply of fluid at a given pressure thereto to cause fluid under pressure to be supplied to the brake cylinder to effect application of the fluid pressure brakes, electroresponsive means effective when energized to condition the valve mechanism to establish a certain pressure in the brake cylinder in response to the supply of fluid at the said given pressure to the valve mechanism and when deenergized to condition the valve mechanism differently so as to establish a pressure in the brake cylinder different from said certain pressure for the said given pressure of fluid supplied to the valve mechanism, at least one traction motor for the vehicle operative as a generator in a dynamic braking circuit to retard the motion of the vehicle, and means under the control of the current in the dynamic braking circuit for controlling energization and deenergization of the said electroresponsive means.

3. A vehicle brake system comprising a brake cylinder, a control pipe chargeable with fluid at different pressures, a valve mechanism operative in response to the charging of said control pipe with fluid under pressure for causing fluid under pressure to be supplied to the brake cylinder to effect application of the brakes, electroresponsive means effective when energized to condition the valve mechanism to establish a pressure in the brake cylinder having a certain uniform ratio to the pressure established in the said control pipe and effective when deenergized to condition the valve mechanism differently so as to establish a pressure in the brake cylinder having a ratio to the pressure established in the said control pipe different from said certain ratio, at least one traction motor for the vehicle operative as a generator in a dynamic braking circuit to retard the motion of the vehicle, and means under the control of the current in the dynamic braking circuit for controlling energization and deenergization of said electroresponsive means.

4. A vehicle brake system comprising a brake cylinder, a valve mechanism operative upon the supply of fluid under pressure thereto to cause fluid under pressure to be supplied to the brake cylinder to effect an application of the fluid pressure brakes, a plurality of electroresponsive devices effective to vary the condition of the said valve mechanism depending upon energization and deenergization of the said electroresponsive devices for causing the valve mechanism to operate to establish a plurality of different pressures in the brake cylinder in response to the supply of fluid at a given pressure to the valve mechanism, at least one traction motor for the vehicle operative as a generator in a dynamic braking circuit to retard the motion of the vehicle, and means under the control of the current in the dynamic braking circuit for selectively controlling energization and deenergization of said electroresponsive devices.

5. A vehicle brake system comprising a fluid pressure brake equipment, at least one traction motor for the vehicle operative as a generator in a dynamic braking circuit to retard the motion of the vehicle, means automatically operative to regulate to a substantially constant value the current in the dynamic braking circuit supplied by the traction motor acting as a generator, means selectively operable to cause said last means to regulate the current in the dynamic braking circuit to any one of a plurality of different substantially constant values, and means under the control of the current in the dynamic braking circuit for controlling the degree of application of the fluid pressure brakes.

6. In a vehicle brake equipment, in combination, an electric brake system, a fluid pressure brake system, manually operative means for initiating the concurrent operation of both of said brake systems to produce a braking effect on the vehicle, and means operable as the vehicle decelerates to continually regulate the electric brake system to produce within limits a uniform degree of electric braking and also effective to so control the fluid pressure brake system as to progressively diminish the degree of fluid pressure braking.

7. A vehicle brake system comprising a fluid pressure brake equipment, at least one traction motor for the vehicle connectable as a generator in a dynamic braking circuit to retard the motion of the vehicle, a rheostat having a resistance element in the said dynamic braking circuit and a movable member shiftable to different positions to vary the amount of the resistance element included in said circuit, means controlled responsively to the current in the dynamic braking circuit for causing the movable member of the rheostat to be shifted progressively to different positions whereby the current in the dynamic braking circuit is regulated to a substantially constant value as the speed of the vehicle changes, and means movable according to the movement of the movable member of the rheostat for controlling the degree of application of the fluid pressure brakes.

8. A vehicle brake system comprising a fluid pressure brake equipment, at least one traction motor for the vehicle connectable as a generator in a dynamic braking circuit to retard the motion of the vehicle, a rheostat having a resistance element in the said dynamic braking circuit and a movable member shiftable to different positions to vary the amount of the resistance element included in said circuit, means controlled responsively to the current in the dynamic braking circuit for causing the movable member of the rheostat to be shifted progressively to different positions whereby the current in the dynamic braking circuit is regulated to a substantially constant value as the speed of the vehicle changes, and means, including means adapted to be positioned in accordance with the position of the movable member of the rheostat, for effecting a reduction in the degree of application of the fluid pressure brakes as the speed of the vehicle reduces.

9. A vehicle brake system comprising a fluid pressure brake equipment, at least one traction motor for the vehicle, manually operated means for concurrently initiating an application of the fluid pressure brakes and establishing a dynamic braking circuit including the traction motor acting as a generator, a rheostat having a resistance element adapted to be included in the dynamic braking circuit and a movable member shiftable to different positions to vary the amount of the resistance element included in said circuit, means controlled responsively to the current in the dynamic braking circuit for effecting movement of the movable member of the rheostat progressively to different positions so as to regulate the current in the dynamic braking circuit to a substantially constant value as the speed of the vehicle changes, and means controlled in accordance with the position of the movable member of the rheostat for controlling the degree of application of the fluid pressure brakes.

10. A vehicle brake system comprising a fluid pressure brake equipment, at least one traction motor for the vehicle, manually operated means for concurrently initiating an application of the fluid pressure brakes and establishing a dynamic braking circuit including the traction motor acting as a generator, a rheostat having a resistance element adapted to be included in the dynamic braking circuit and a movable member shiftable to different positions to vary the amount of the resistance element included in said circuit, means controlled responsively to the current in the dynamic braking circuit for effecting movement of the movable member of the rheostat progressively to different positions so as to regulate the current in the dynamic braking circuit to a substantially constant value as the speed of the vehicle changes, and means controlled according to the position of the movable member of said rheostat for effecting a reduction in the degree of application of the fluid pressure brakes as the speed of the vehicle reduces.

11. A vehicle brake system comprising a brake cylinder, a valve mechanism operative to control the supply of fluid under pressure to and the release of fluid under pressure from the brake cylinder to control the application and the release of the fluid pressure brakes, a brake valve device for controlling the operation of said valve mechanism, at least one traction motor for said vehicle, means effective when the said brake valve is operated to cause the valve mechanism to effect application of the fluid pressure brakes for establishing a dynamic braking circuit including the traction motor acting as a generator, a rheostat having a resistance element included in said circuit and a movable member shiftable to different positions to vary the amount of the resistance element in said circuit, means controlled responsively to the current in the said circuit for causing the movable member of the rheostat to be moved progressively to different positions as the speed of the vehicle changes so as to regulate the current in the circuit to a substantially constant value, and control means operative in accordance with the movement of the movable member of the rheostat for effecting operation of said valve mechanism to reduce the pressure in said brake cylinder as the speed of the vehicle reduces.

12. A vehicle brake system comprising a brake cylinder, a valve mechanism operative upon the supply of fluid at a given pressure thereto to cause fluid under pressure to be supplied to the brake cylinder to effect application of the fluid pressure brakes, electroresponsive means effective when energized to condition the valve mechanism to establish a certain pressure in the brake cylinder in response to the supply of fluid at the said given pressure to the valve mechanism and when deenergized to condition the valve mechanism differently so as to cause it to establish a pressure in the brake cylinder different from said certain pressure in response to the said given pressure of fluid supplied to the valve mechanism, at least one traction motor for the vehicle, manually operated means for effecting the supply of fluid at a given pressure to the said valve mechanism and concurrently therewith effective to establish a dynamic braking circuit including the said motor acting as a generator, a rheostat having a resistance element in said circuit and a movable member shiftable to different positions to vary the amount of said resistance element in said circuit, means controlled responsively to the current in said circuit for causing the movable member of said rheostat to be moved progressively to different positions so as to regulate current in said circuit to a substantially constant value as the speed of the vehicle changes during the application of the brakes, and means operated in accordance with the movement of the movable member of said rheostat for controlling energization and deenergization of said electroresponsive means.

13. In a vehicle brake system comprising a brake cylinder, a control pipe chargeable with fluid at different pressures, a valve mechanism operative in response to the charging of said control pipe with fluid under pressure for causing fluid under pressure to be supplied to the brake cylinder to effect application of the brakes, electroresponsive means effective when energized to condition the valve mechanism to establish a fluid pressure in the brake cylinder having a certain uniform ratio to the pressure established in said control pipe and effective when deenergized to condition the valve mechanism differently so as to establish a pressure in the brake cylinder having a ratio to the pressure established in said control pipe different from said certain ratio, at least one traction motor for the vehicle, manually operative means effective to cause charging of said control pipe with fluid at a selected pressure and concurrently therewith to establish a dynamic braking circuit including the said motor acting as a generator, a rheostat having a resistance element included in said circuit and a movable member shiftable to different positions to vary the amount of said resistance element in said circuit, means controlled responsively to the current in said circuit for causing the movable member of the rheostat to be shifted progressively to different positions so as to cause regulation of the current in said circuit to a substantially constant value as the speed of the vehicle changes, and means operative in accordance with the movement of the movable member of said rheostat for controlling energization and deenergization of said electroresponsive means.

14. In a vehicle brake system comprising a brake cylinder, a control pipe chargeable with fluid at different pressures, a valve mechanism operative in response to the charging of said control pipe with fluid under pressure for causing fluid under pressure to be supplied to the brake cylinder to effect application of the brakes, electroresponsive means effective when energized to condition the valve mechanism to establish a fluid pressure in the brake cylinder having a certain uniform ratio to the pressure established in said control pipe and effective when deenergized to condition the valve mechanism differently so as to establish a pressure in the brake cylinder having a ratio to the pressure established in said control pipe different from said certain ratio, at least one traction motor for the vehicle, manually operative means effective to cause charging of said control pipe with fluid at a selected pressure and concurrently therewith to establish a dynamic braking circuit including the said motor acting as a generator, a rheostat having a resistance element included in said circuit and a movable member shiftable to different positions to vary the amount of said resistance element in said circuit, means controlled responsively to the current in said circuit for causing the movable member of the rheostat to be shifted progressively to different positions so as to cause regulation of the current in said circuit to a substantially constant value as the speed of the vehicle changes, and a switch device operatively synchronized with the movable member of said rheostat for effecting energization of said electroresponsive means when the movable member of the rheostat is on one side of a predetermined position thereof and for effecting deenergization of the electroresponsive means when the movable member of the rheostat is on the opposite side of said predetermined position.

15. A vehicle brake system comprising a brake cylinder, a valve mechanism operative upon the supply of fluid under pressure thereto to cause fluid under pressure to be supplied to the brake cylinder to effect an application of the fluid pressure brakes, a plurality of electroresponsive devices effective to vary the condition of said valve mechanism depending upon energization and deenergization of the said electroresponsive devices for causing the valve mechanism to operate to establish a plurality of different pressures in the brake cylinder in response to a given pressure of fluid supplied thereto, at least one traction motor for the vehicle, manually operative means operative to supply fluid at a given pressure to the valve mechanism and concurrently therewith to establish a dynamic braking circuit including said motor acting as a generator, a rheostat having a resistance element included in said circuit and a movable member movable to different positions for varying the amount of said resistance element in said circuit, means controlled responsively to the current in said circuit for causing said movable member to be shifted progressively to different positions so as to cause regulation of the current in said circuit to a substantially constant value as the speed of the vehicle changes, and switch means operative according to the movement of the movable member of said rheostat for selectively controlling energization and deenergization of said plurality of electroresponsive devices.

16. A vehicle brake system comprising a fluid pressure brake equipment, at least one traction motor for the vehicle, manually operative means having a normal position in which the fluid pressure brakes are released and shiftable out of its normal position different amounts to effect application of the fluid pressure brakes substantially in accordance with the amount of displacement out of its normal position, said manually operated means being effective upon displacement out of its normal position to establish a dynamic braking circuit including said motor acting as a generator, a rheostat having a resistance element in said circuit and a movable member shiftable to different positions to vary the amount of said resistance element in said circuit, means controlled responsively to the current in said circuit for causing the movable member of said rheostat to be shifted progressively to different positions as the speed of the vehicle changes during application of the brakes so as to regulate the current in the dynamic braking circuit to any one of a plurality of different substantially constant values, means effective in accordance with the degree of displacement of the manually operated means out of its normal position for causing the last said means to selectively effect regulation of the current in the said circuit to a particular one of the plurality of different substantially constant values of current corresponding to the degree of displacement of the manually operated means out of its normal position, and a plurality of control means rendered selectively effective according to the degree of displacement of the manually operated means out of its normal position for effecting variation in the degree of application of the fluid pressure brakes as the speed of the vehicle diminishes.

17. A vehicle brake system comprising a fluid pressure brake equipment, at least one traction motor for the vehicle, manually operative means having a normal position in which the fluid pressure brakes are released and shiftable out of its normal position different amounts to effect application of the fluid pressure brakes substantially in accordance with the amount of displacement out of its normal position, said manually operated means being effective upon displacement out of its normal position to establish a dynamic braking circuit including said motor acting as a generator, a rheostat having a resistance element in said circuit and a movable member shiftable to different positions to vary the amount of said resistance element in said circuit, means controlled responsively to the current in said circuit for causing the movable member of said rheostat to be shifted progressively to different positions as the speed of the vehicle changes during application of the brakes so as to regulate the current in the dynamic braking circuit to any one of a plurality of different substantially constant values, means effective in accordance with the degree of displacement of the manually operated means out of its normal position for causing the last said means to selectively effect regulation of the current in the said circuit to a particular one of the plurality of different substantially constant values of current corresponding to the degree of displacement of the manually operated means out of its normal position, and a plurality of control means operative in accordance with the movement of the movable member of said rheostat severally adapted to effect variation of the degree of application of the fluid pressure brakes as the speed of the vehicle diminishes, and means for rendering only one of said plurality of control means effective depending upon the degree of displacement of the manually operated means out of its normal position.

18. A vehicle brake system comprising a brake cylinder, a valve mechanism operative to control the supply of fluid under pressure to and the release of fluid under pressure from the brake cylinder to control the application and the release of the fluid pressure brakes, an electroresponsive device effective when energized to condition the valve mechanism to establish a certain pressure in the brake cylinder in response to a given pressure of fluid supplied to said valve mechanism and effective when deenergized to condition the valve mechanism differently so as to cause it to establish in the brake cylinder a pressure different from said certain pressure in response to said given pressure of fluid supplied to said valve mechanism, at least one traction motor for the vehicle, manually operated means having a normal position and operative different amounts out of said normal position to vary the pressure of fluid supplied to the valve mechanism in accordance with the degree of displacement of the manually operated means out of its normal position, said manually operated means being effective upon displacement out of its normal position to cause the establishment of a dynamic braking circuit including said traction motor acting as a generator, a rheostat having a resistance element included in said circuit and a movable member shiftable to different positions to vary the amount of the resistance element in said circuit, means controlled responsively to the current in said circuit for causing said movable member of the rheostat to be shifted progressively to different positions so as to regulate the current in the dynamic braking circuit to any one of a plurality of different substantially constant values as the speed of the vehicle diminishes during an application of the brakes, means effective in accordance with the degree of displacement of the manually operated means out of its normal position for causing the last said means to be effective to cause regulation of the current in the dynamic braking circuit to a corresponding one of the plurality of different substantially constant values, a plurality of separate means operative according to the movement of the movable member of the rheostat adapted to be severally effective to control energization and deenergization of said electroresponsive device, and means effective in accordance with the degree of displacement of the manually operated means out of its normal position for selectively rendering only one of said switch means operatively effective to control energization and deenergization of the electroresponsive device.

19. In a vehicle brake equipment, a traction motor connectable as a generator in a dynamic braking circuit to retard the motion of the vehicle, a fluid pressure brake system for the vehicle, a rheostat for controlling the current in the dynamic braking circuit, a motor controlled according to the current in the dynamic braking circuit for operating the rheostat so as to regulate the current in the dynamic braking circuit to a substantially constant value as the speed of the vehicle diminishes, and means also operated by said motor for controlling the degree of application of the fluid pressure brakes.

20. In a vehicle brake equipment, a traction motor connectable as a generator in a dynamic braking circuit to retard the motion of the vehicle, a fluid pressure brake system for the vehicle, a rheostat for controlling the current in the dynamic braking circuit, a motor controlled according to the current in the dynamic braking circuit for operating the rheostat so as to regulate the current in the dynamic braking circuit to a substantially constant value as the speed of the vehicle diminishes, and means also operated by said motor in synchronism with the operation of the rheostat for controlling the degree of application of the fluid pressure brakes.

21. In a vehicle brake equipment, a traction motor connectable as a generator in a dynamic braking circuit to retard the motion of the vehicle, a fluid pressure brake system for the vehicle, a rheostat for controlling the current in the dynamic braking circuit, a motor controlled according to the current in the dynamic braking circuit for operating the rheostat so as to regulate the current in the dynamic braking circuit to a substantially constant value as the speed of the vehicle diminishes, and means also operated by said motor during an application of the brakes for effecting a reduction of the degree of application of the fluid pressure brakes as the speed of the vehicle diminishes.

JOHN W. LOGAN, Jr.